United States Patent [19]

Ponder

[11] 4,219,742
[45] Aug. 26, 1980

[54] HYBRID DUAL VOLTAGE TRANSMISSION SYSTEM

[75] Inventor: Jonathan Z. Ponder, Lansdale, Pa.
[73] Assignee: Gould Inc., Rolling Meadows, Ill.
[21] Appl. No.: 971,221
[22] Filed: Dec. 20, 1978
[51] Int. Cl.² ............................................. H02G 7/20
[52] U.S. Cl. ............................ 307/147; 174/40 R; 174/41
[58] Field of Search .................. 174/40 R, 41, 43, 44, 174/45 R, 70 A, 105 R, 115, 127; 307/91, 147, 148

[56] References Cited

U.S. PATENT DOCUMENTS

| 409,565 | 8/1889 | DeFerranti | 307/147 X |
| 3,869,621 | 4/1975 | Wilson | 307/147 |

Primary Examiner—Laramie E. Askin
Attorney, Agent, or Firm—Ostrolenk, Faber, Gerb & Soffen

[57] ABSTRACT

A high power high voltage transmission system consists of three highvoltage cables which are suspended from a transmission tower in insulated relationship with one another and with respect to the ground. Each of the cables is shown as a gas-insulated cable having a central high voltage conductor and an outer conductive housing which is insulated from the central conductor. The line-to-line voltage of the central conductors of each of the high voltage cables is 765 kV, while the potential between the outer conductive housings of each of the cables is 345 kV. The total right of way and height of the support tower is that needed for a conventional 345 kV transmission system even though the system is used to transmit 765 kV line-to-line voltage.

4 Claims, 4 Drawing Figures

1

HYBRID DUAL VOLTAGE TRANSMISSION SYSTEM

BACKGROUND OF THE INVENTION

This invention relates to high voltage electric power transmission systems, and more specifically relates to a novel hybrid system which permits the transmission of exceptionally high voltages using transmission tower heights and rights of way which are designed for a much lower transmission voltage.

The increase of voltage in high voltage high power transmission systems has led to numerous problems. For example, when the voltage of the transmission system is increased to 765 kV, the towers for supporting the conductors of the system must be extremely high and the spacing between the adjacent conductors of the multiphase system must be very wide. This requires substantial increases in the right of way needed for the transmission line and considerably increases the costs of the support towers.

There is also increasing concern over possibly harmful effects of the increased electric field produced by overhead transmission lines. This includes the possibility that the very high electric field strength around extremely high voltage (EHV) lines can charge objects such as fences, metal roofs, automobiles and the like to dangerous potentials. Moreover, living animals can themselves become charged to high potentials when in proximity in EHV transmission lines, as evidenced by the discharge sparking which can occur when a person near such a transmission line touches another object.

There is also concern over adverse effects on the health of human beings when in the sustained presence of the very high electric and magnetic fields produced by EHV transmission lines. Other problems which have been considered in connection with EHV transmission lines are that the higher voltages can cause television interference, radio interference and substantial audible noise.

BRIEF SUMMARY OF THE PRESENT INVENTION

In accordance with the present invention, the electrical conductor used for a suspended high voltage transmission line consists of a high voltage insulated cable which itself consists of a central conductor surrounded by and insulated from an outer conductive housing or sheath. In normal use, the outer conductive cable sheath would be grounded. In accordance with the invention, a plurality of cables, insulated from one another, are suspended from a tower and a portion of the total voltage to be transmitted by the tower is confined within the cables. Thus the tower, in effect, sees only the voltage on the outer housings; and the transmission line, therefore, appears to be a much lower voltage transmission line than it would be if the central conductors of the cable were exposed to air.

While any high voltage cable can be used, the cable suspended from the transmission line tower, in accordance with the invention, is described hereinafter as one which is a sulfur hexafluoride gas-insulated cable which can be of the type shown in any of U.S. Pat. Nos. 3,944,716, 3,982,806 or 4,034,147. Clearly, however, oil-filled cable and other insulated cable could also be used.

In one particular embodiment of the invention, a 765 kV line-to-line EHV transmission system uses a gas-insulated transmission line suspended from conventional spaced towers which have a height and a right of way which is that for a conventional 345 kV transmission line system. Each gas-insulated cable then has its central conductor at a line-to-line potential of 765,000 volts while the outer conductive housings of each of the high voltage conductors are at a line-to-line voltage of 345 kV. These outer housings are suitably suspended in spaced relation from the spaced transmission line support towers. Electrically, the transmission line system is identical to a conventional 345 kV transmission line system, except that the conductors will be relatively large diameter high voltage cables (typically the outer housing may have an outer diameter up to about 18 inches). However, the transmission line system requires a significantly smaller right of way and is significantly lower than if the transmission line tower were designed for 765 kV.

An additional advantage of the novel invention is that the outer housing or cable sheath will provide a shielding effect to eliminate problems usually associated with 765 kV lines, such as radio interference caused by corona. Moreover, audible noise and high electrostatic fields are reduced since these effects cease to be a major problem at 345 kV.

While the preferred embodiment of the invention discloses a 765 kV line using a 345 kV cable, it will be obvious that other voltages and other voltage divisions could be used.

It should be noted that both the central conductor and the outer housing of the central conductor of the cable can both carry useful power in the system of the invention. For example, assuming an ambient temperature of 25° C., a cable sheath temperature limit of 75° C. and an ambient air velocity of two feet per second, the system to be described can carry about 6,000 MVA of power. This assumes 2800 amperes in the 765 kV line portion and 4000 amperes in the 345 kV line portion. Thus, using the novel dual voltage system of the invention, it is possible to carry three to six times the power of a typical 345 kV line using the same tower height and right of way.

DETAILED DESCRIPTION OF THE DRAWINGS

Figure 1:
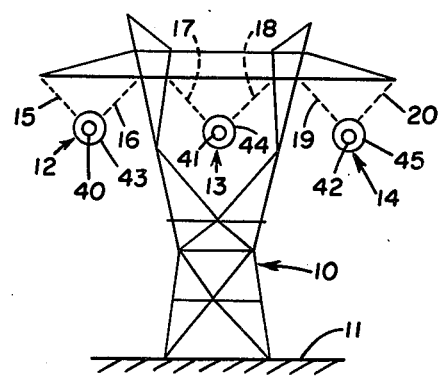
FIG. 1 is a schematic elevational view of a tower which suspends a high voltage cable (exaggerated in diameter) in accordance with the invention.

Referring first to FIG. 1, there is shown one conventional tower 10 of a series of spaced towers used to support electrical transmission lines from a ground surface 11. The tower 10 will have a height dependent upon the voltage of the conductors which it supports. The spacing between the conductors will determine the necessary land right of way necessary for the tower.

Figure 2:
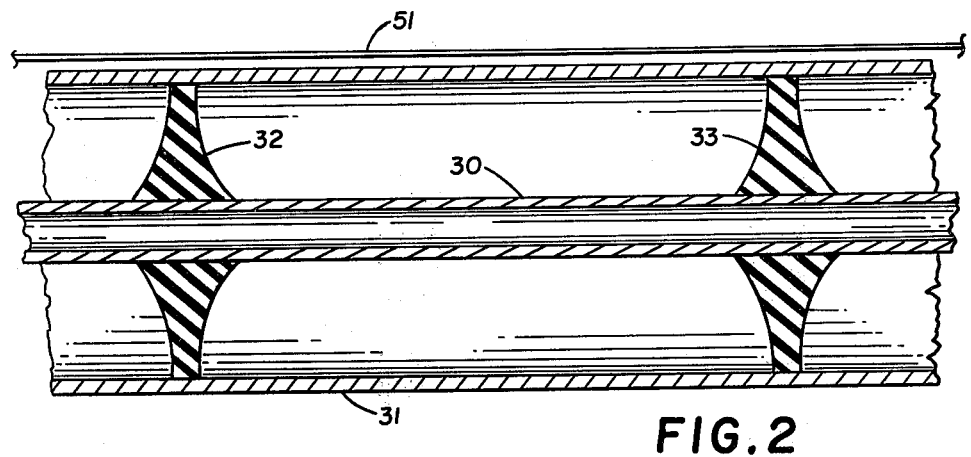
FIG. 2 is a cross-sectional view of a typical gas-insulated transmission cable which can be suspended between towers, such as the tower of FIG. 1.

In accordance with the invention and instead of a conventional single or bundled wire conductor, power is transmitted along high voltage cables, schematically illustrated by cables 12, 13 and 14, which are suspended from an overhead arm of the tower 10 by suspension insulators 15-16, 17-18 and 19-20, respectively. Each of the high voltage cables 12, 13 and 14 typically may consist of a central conductor and an outer conductor which are insulated from one another. A typical cable is shown in FIG. 2 as comprising a central conductor 30 which is suspended within an outer conductive housing 31 by means of spaced insulation discs 32 and 33. The interior of housing 31 is then filled with a suitable electronegative gas such as sulfur hexafluoride under a pressure of about 3 atmospheres. With such a system and with an outer diameter of about 18 inches for housing 31 and an outer diameter of about 6 inches for conductor 30, the potential between inner conductor 30 and outer housing 31 can safely be about 200 kV, which is the line to neutral voltage for a 345 kV system.

In FIG. 1 conductors 12, 13 and 14 are each of the concentric type shown in FIG. 2 and contain central conductors 40, 41 and 42 which are surrounded by but insulated from outer conductors 43, 44 and 45, respectively. In the illustrative embodiment of the invention, the line-to-line voltage between central conductors 40, 41 and 42 is 765 kV, while the line-to-line voltage between outer conductors 43, 44 and 45 is 345 kV. Thus, the spacing between conductors 12, 13 and 14 and their height above the ground is that of a conventional 345 kV transmission line. Thus a significant portion of the voltage transmitted by the transmission line is contained within the cables 12, 13 and 14 so that additional air space is not needed to insulate this portion of the transmitted voltage.

While the illustrative embodiment of the invention shows a gas-insulated conductor of the form shown in FIG. 2, it will be noted that the gas-insulated conductor could be a flexible transmission line of the type shown in U.S. Pat. No. 4,095,041. Moreover, any type of high voltage cable could be used. For example, a polyethylene or oil paper-insulated cable could be suspended from the transmission tower with the sheath of the cable used to carry current at a lower voltage than the central conductor. Moreover, it is possible that the outer sheath of the cable, such as the outer conductor 31 in FIG. 2, could be used simply as an electrostatic shield while still performing the function of the present invention.

Figure 3:
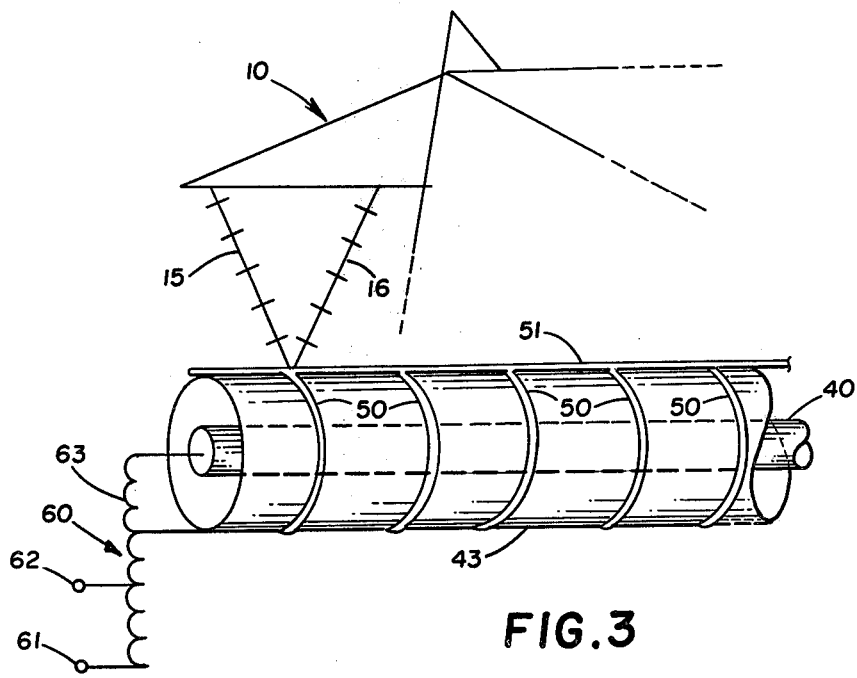
FIG. 3 schematically illustrates, in perspective view, one manner in which the high voltage cable can be suspended from a tower through the use of suitable suspension insulators.

FIG. 3 shows the manner in which the cable 12, for example, of FIG. 1 can be supported from the tower 10, and further illustrates the electrical connection to the cable. As shown in FIG. 3, the outer sheath 43 is provided with spiral steel support bands such as the bands 50 which extend along the length of the housing 43. Each of the bands 50 is fixed to an upper steel messenger wire 51. Conventional suspension insulators 15 and 16 which are schematically illustrated are then fixed at their bottom to the steel messenger wire 51 and to the band 50 in order to suspend the entire gas-insulated cable from the tower 10.

The electrical connection to the cable is shown for the single phase of FIG. 3 as consisting of an autotransformer 60 which has a low voltage winding section having the input terminals 61 and 62. The auto-transformer winding is a 765/345 kV winding with the 345 kV section 63 connected between the inner conductor 40 and the outer conductor 43. Consequently, in a three phase system, the line-to-line voltage between the central conductors of the three conductors 12, 13 and 14 of FIG. 1 will be 765 kV while the line-to-ground voltage of the central conductors 40, 41 and 42 will be 440 kV. Similarly, the line-to-line voltage between the outer sheaths 43, 44 and 45 will be 345 kV while the voltage from the outer conductors 43, 44 and 45 to ground will be 200 kV. Note that the suspension insulators 15 and 16 will have a line-to-neutral voltage of about 200 kV and a line-to-line voltage of about 345 kV so that they are the same size electrically that would be needed in a conventional 345 kV transmission line system.

Figure 4:
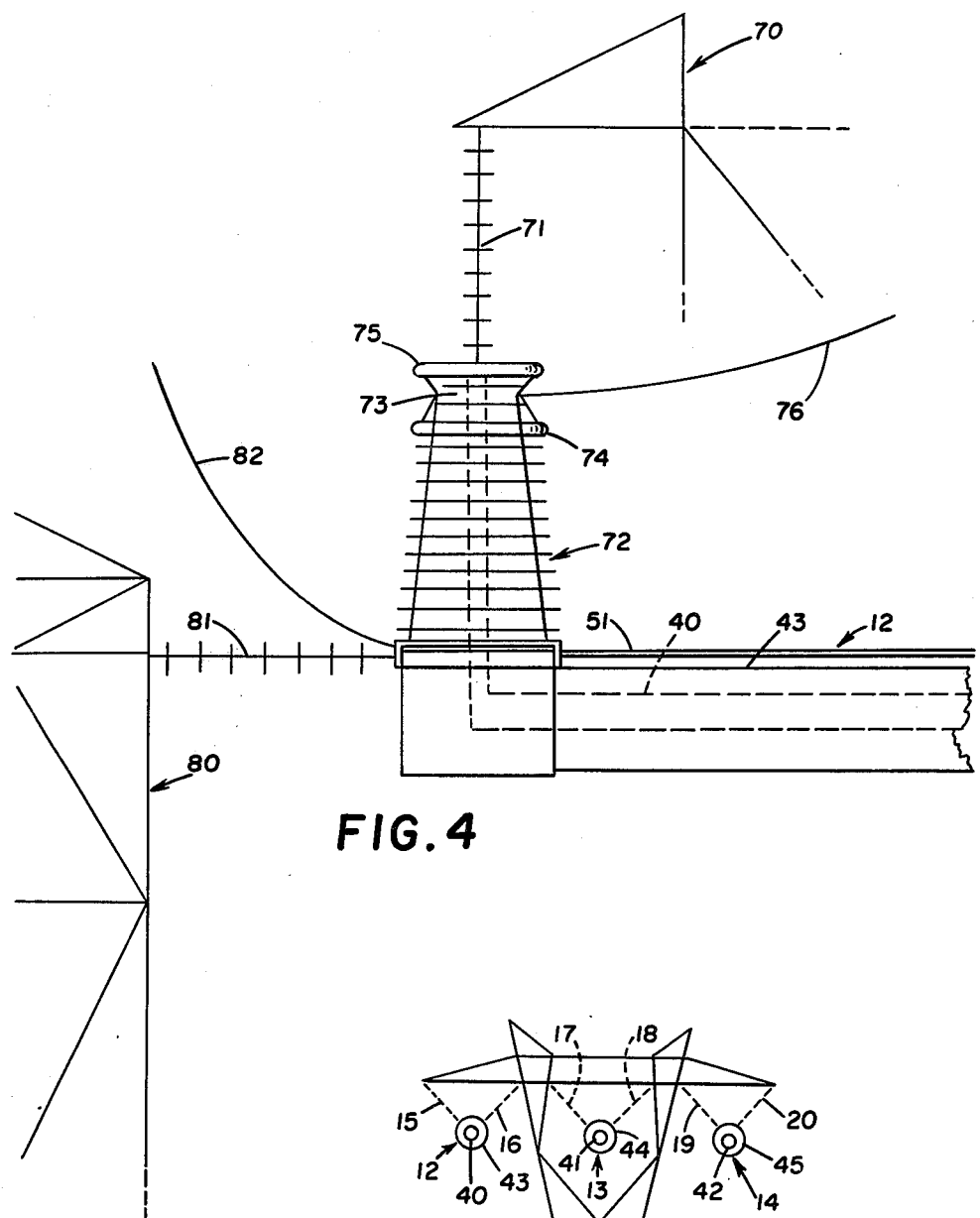
FIG. 4 schematically illustrates in plan view a sulfur hexafluoride-air termination at the end of the dual voltage line.

FIG. 4 illustrates the sulfur hexafluoride to air termination which is needed at the end of the dual voltage line. Thus, at the end of the line near the 765 kV air terminal, there is a 765 kV suspension tower 70 which supports a 765 kV suspension insulator 71. The end of the housing 43 which is illustrated in FIG. 4 then receives a conventional porcelain entrance bushing 72 which may be of the type shown in U.S. Pat. No. 3,934,071, whereby the central conductor is connected to the output terminal 73 of bushing 72 (surrounded by suitable corona rings 74 and 75) and a 765 kV line tap 76 is taken from the terminal 73. A dead end tower 80 is also provided having a 345 kV suspension insulator 81 extending therefrom and fixed to the end of housing 43. Note that the housing 43 is physically supported at its end by the insulators 71 and 81. A 345 kV line tap 82 is then taken from the housing 43.

Clearly other arrangements could be provided for the termination of the line and other transformer arrangements could be used in place of the arrangement shown in FIG. 3.

Although the present invention has been described in connection with a preferred embodiment thereof, many variations and modifications will now become apparent to those skilled in the art. It is preferred therefore, that the present invention be limited not by the specific disclosure herein, but only by the appended claims.

What is claimed is:

1. A hybrid dual voltage transmission system, comprising:
   a plurality of high voltage cables, each comprising an elongated central conductor and an outermost concentric conductor insulated from and coextensive with said central conductor, each of said outermost conductors being at first potentials which are substantially above ground potential, each of said central conductors being at second potentials which are greater than said first potentials; and
   support means including a suspension tower which is mechanically connected to said outermost concentric conductors and spaces said outermost concentric conductors from one another by a distance sufficient to prevent breakdown between said outer concentric conductors, said distance being insufficient to insulate said central conductors from one another in the absence of said outermost concentric conductors, said suspension tower occupying a space and having a height needed to support a transmission system at said first potential while transmitting voltages at said second potential.

2. The transmission system of claim 1 wherein said high voltage cables are gas-insulated cables.

3. The transmission system of claim 2 wherein said first and second potentials are each greater than about 100 kV.

4. The transmission system of claim 3 wherein said second potential is equal to or greater than about 765 kV.

* * * * *